Aug. 3, 1965 D. S. STRADER ETAL 3,198,360
BUCKET POSITION CONTROL MECHANISM
Filed April 30, 1963 2 Sheets-Sheet 1
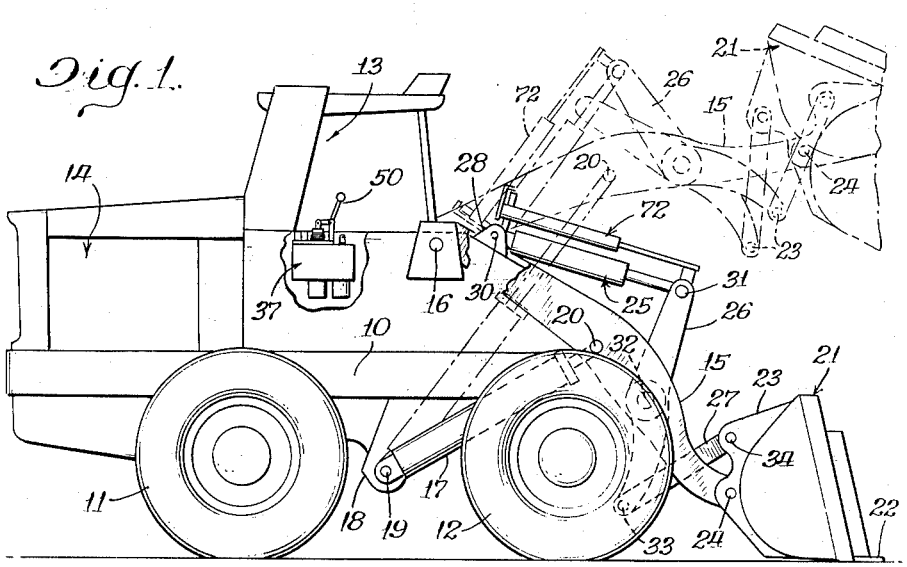
Fig. 1.
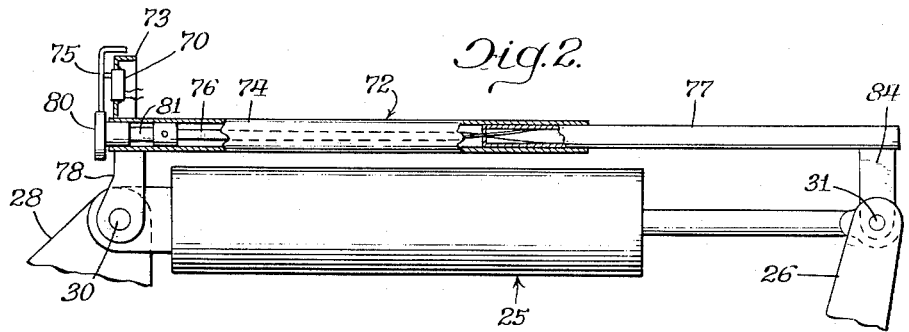
Fig. 2.
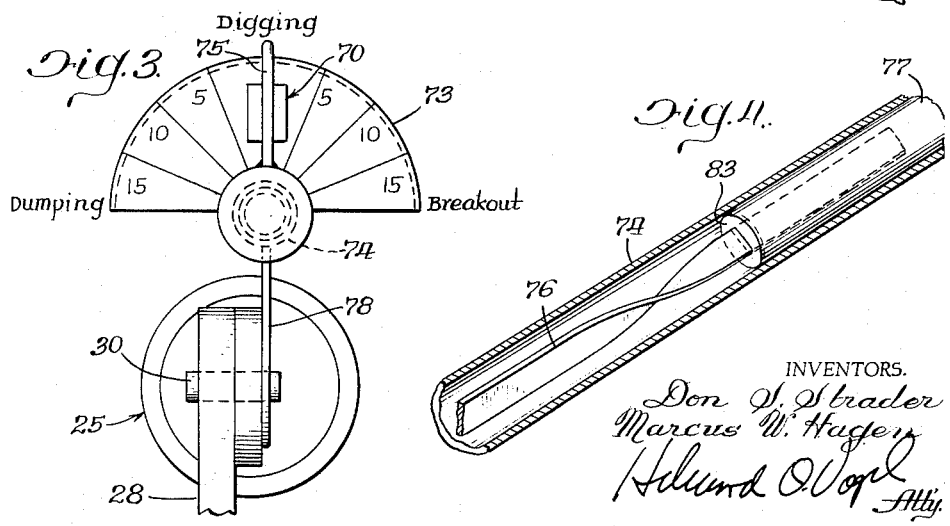
Fig. 3.
Fig. 4.
INVENTORS.
Don S. Strader
Marcus W. Hagen

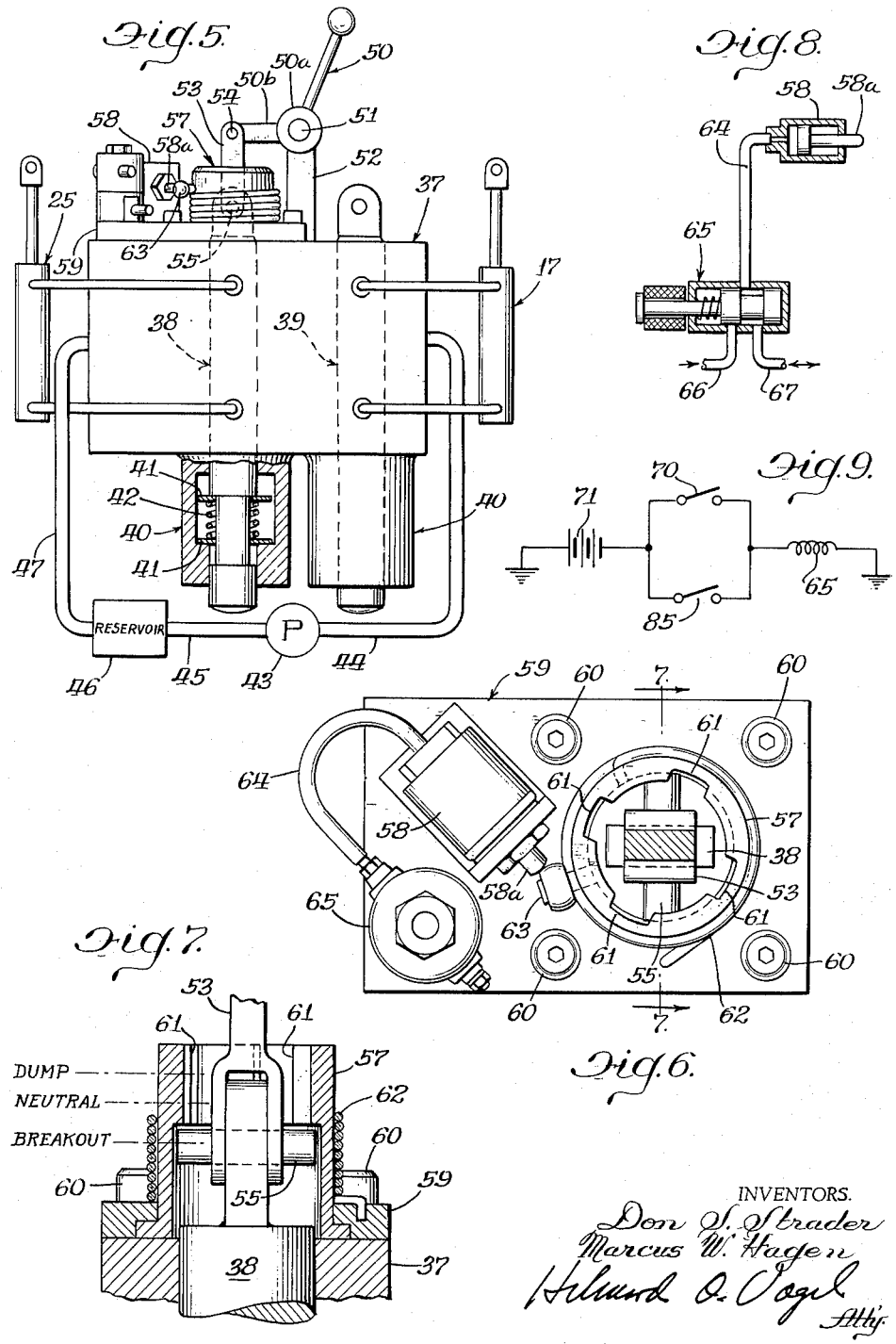

United States Patent Office 3,198,360
Patented Aug. 3, 1965

3,198,360
BUCKET POSITION CONTROL MECHANISM
Don S. Strader, Mount Prospect, Ill., and Marcus W. Hagen, Kenosha, Wis., assignors to The Frank G. Hough Co., a corporation of Illinois
Filed Apr. 30, 1963, Ser. No. 276,883
5 Claims. (Cl. 214—140)

This invention relates generally to tool or implement control mechanism wherein the tool is operatively carried from a vehicle and is movable through a certain range under control of the operator of the vehicle, and more particularly to a novel arrangement providing automatic indexing of the tool in some predetermined position intermediate the range of movement of the tool. In the present embodiment of the invention the novel automatic indexing arrangement is applied to a front-end type tractor loader.

The primary object of the present invention is to provide a novel arrangement for accurately and positively indexing a vehicle carried movable tool in some predetermined position intermediate the range of movement of the tool.

It is a further object to provide a novel arrangement for accurately and positively indexing the bucket of a front-end type tractor loader in a predetermined position.

It is a further object to provide novel indexing means for a hydraulically operated front-end type tractor loader which will operate in cooperation with the bucket-tilting means to provide automatic indexing of the bucket in a predetermined tilted position.

It is still another object to provide novel means in arrangements of the preceding paragraphs for overriding the automatic indexing function of the arrangements.

It is still another object to provide novel indexing means according to the preceding paragraphs in which the indexing means will operate to index the tool or bucket in one position within one range of movement of the tool or bucket while the tool or bucket is further being moved within another range of movement.

It is a further object to provide a novel indexing means for the bucket of a front-end type tractor loader which will automatically operate when the bucket is being pivoted from a dump position toward a digging position to stop the bucket in a predetermined digging position.

A further object is to provide a novel tool-indexing arrangement which can easily be applied to and incorporated in the hydraulic circuit means of existing types of vehicle-carried hydraulically-movable tools, to provide automatic indexing of the tool in a predetermined position.

Other objects and features of the invention will be apparent upon a perusal of the following specification and drawings in which:

FIGURE 1 is a side elevational view of a front-end type tractor loader constructed according to the present invention;

FIGURE 2 is an enlarged partial view of the indicator means of FIGURE 1 for indication the pivoted portion of the bucket shown in FIGURE 1;

FIGURE 3 is an enlarged end view of the structure shown in FIGURE 2;

FIGURE 4 is an enlarged partial view of a portion of the structure shown in FIGURE 2;

FIGURE 5 is an enlarged side elevational view of the valve arrangement of FIGURE 1 with the hydraulic circuits connected thereto being shown in reduced scale and substantially diagrammatical;

FIGURE 6 is an enlarged top plan view of the valve arrangement of FIGURE 5;

FIGURE 7 is a partial cross-sectional view of the structure shown in FIGURE 6 and taken substantially along the line 7—7 of FIGURE 6;

FIGURE 8 is a diagrammatic view of a portion of the hydraulic circuits of the invention; and FIGURE 9 is an electrical circuit diagram of a portion of the invention.

The present embodiment is the preferred embodiment, but it is to be understood that changes can be made in the present embodiment by one skilled in the art without departing from the spirit and scope of the present invention.

Generally, the novel indexing means in the present embodiment of the invention is applied to a front-end type tractor loader and is partially carried on the tractor and partially carried on the bucket-tilting assembly. The bucket-tilting assembly of the tractor loader includes a double-acting hydraulic cylinder, one end of which is pivotally carried on the tractor, and the other end of which is connected to the bucket by a linkage and leverage arrangement. The double-acting hydraulic cylinder is selectively extended or retracted to pivot the bucket relative to the boom. In the present embodiment, an extension of the hydraulic cylinder causes the bucket to be pivoted rearwardly to what is commonly called the breakout position. A substantially complete retraction of the hydraulic cylinder will cause the bucket to be pivoted to a dump position. The digging position of the bucket is intermediate the breakout and dump positions.

The bucket hydraulic cylinder is selectively extended and retracted by means of a manually operated hydraulic control valve carried in the operator's compartment of the tractor. The hydraulic control valve comprises a valve body having a bucket valve spool and a boom valve spool slidably carried therein for longitudinally reciprocating movement. Hand levers are connected to the valve spools for manual reciprocation thereof. Each end of the hydraulic cylinder for tilting the bucket is connected by suitable conduits into the valve bore for the bucket spool. A source of hydraulic fluid pressure and a reservoir are also connected to the control valve. It is contemplated in the present invention that the control valve be of the type commonly known as an open-center valve. In such a valve, the bucket valve spool is normally spring biased to a center neutral position. In the neutral position, both ends of the bucket hydraulic cylinder are blocked and the source of hydraulic pressure is connected to the reservoir conduit. Moving the hand lever to move the bucket spool in one direction from the center neutral position will cause the source of hydraulic fluid pressure to be connected to one end of the hydraulic cylinder while the other end of the cylinder is connected to the reservoir. Manual movement of the hand lever to move the bucket spool in the opposite direction from the center neutral position will cause a reversal of the connections of the source of the hydraulic fluid pressure and the reservoir to the hydraulic cylinder. Thus it may be seen that when the operator of the tractor loader moves the bucket spool hand lever in one direction, the bucket is pivoted in one direction, and when the operator moves that hand lever in the opposite direction, the bucket is pivoted in the opposte direction. When the hand lever is released, the bucket is stopped in whatever pivoted position it had attained prior to release of the hand lever.

In the present embodiment of the invention, the extending end of the bucket spool, which is connected to the hand lever by means of a link assembly, is enclosed by a detent sleeve which is rotatively carried on the valve body. The inner wall of the detent sleeve is provided with a number of longitudinally extending slots or grooves which cooperate in a particular manner with a pin carried in the extending end of the bucket spool. That pin is commonly used in existing hydraulically operated tractor loaders for connection of the hand lever to the bucket spool. It is, of course, obvious that if the invention is applied to some existing hydraulic control valve wherein the noted pin is of an incorrect length for proper cooperation with the grooves of the detent sleeve, it is a simple matter to replace that pin by one of a suitable length. The detent sleeve is rotatively spring biased in a direction to cause engagement by a radially extending arm carried by the detent sleeve against the rod end of a small air cylinder. When the small air cylinder is in a retracted position, the resulting rotated position of the detent sleeve may be called the operated position thereof. This position of the detent sleeve is shown in FIGURES 5, 6 and 7. When the small air cylinder is extended, the detent sleeves is rotated against the biasing force of the spring to a second rotated position which may be called the restored position of the detent sleeve. In the restored position of the detent sleeve, the extending end of the bucket spool and the pin carried therethrough are free to enter the slots or grooves in the inner wall of the detent sleeve to permit the bucket spool to be moved outwardly of the valve body. When the bucket spool is the center neutral position, the bucket spool is longitudinally positioned so that the pin through the extending end of the bucket spool is within the grooves of the detent sleeve. That bucket spool position is indicated in FIGURE 7 by a dotted line designated Neutral and representing the axis of the pin through the extending end of the bucket spool. From that center neutral position, the bucket spool may be moved further outwardly of the valve body, or upwardly as viewed in the drawings, to the operated position of the bucket spool for operation of the bucket cylinder to pivot the bucket forwardly or toward the dump position. That bucket spool position is indicated in FIGURE 7 by a dotted line designated Dump. When the bucket spool is moved inwardly of the valve body, or downwardly as viewed in the drawings, the bucket spool will be moved from the center neutral position to the operated position thereof for operation of the bucket cylinder to cause pivoting of the bucket rearwardly or toward the breakout position. That bucket spool position is shown in FIGURES 5, 6 and 7 and is indicated in FIGURE 7 by a dotted line designated Breakout. Whenever the bucket spool is moved downwardly to the Breakout position, the pin through the extending end of the bucket spool will move out of the aforedescribed grooves and into an enlarged cylindrical portion of the detent sleeve below the groove. If the small air cylinder is not operated when the pin is moved downwardly out of the slots, the detent sleeve will be rotated under the influence of its spring biasing means to the operated position thereof. In this position of the detent sleeve, the bucket spool will be locked in the Breakout position. It should be noted that irrespective of any operated position of the small air cylinder, the detent sleeve cannot rotate to its operated position since the bucket spool is not free to rotate, and the pin through the extending end thereof will, in the grooves of the detent sleeve, maintain the detent sleeve in its restored position. From the foregoing it may be seen that the bucket spool may be freely moved between the Neutral and Dump positions with the pin through the extending end of the bucket spool freely sliding in the grooves of the detent sleeve. Further, if the operator releases the hand lever when the bucket spool is in the Dump position, the spring biasing means for the bucket spool will return the bucket spool to the Neutral position. However, if the operator by appropriate operation of the hand lever moves the bucket spool inwardly of the valve body to the Breakout position, the bucket spool will not be returned to the Neutral position when the operator releases the hand lever.

The above described arrangement is combined with certain indicator means for operating the small air cylinder to extend the piston rod thereof to rotate the detent sleeve from the operated position to the restored position thereof. The specific indicator means used in the present embodiment is by way of example only as many other types of indicator means may be used to cause the extension at the small air cylinder at the appropriate moment. In the present embodiment the indicator means comprises a pointer movable over a scale, and the pointer is moved in response to the extensions and retractions of the bucket cylinder. The extensions and retractions of the bucket cylinder are used in the present embodiment because the various pivoted positions of the bucket are a direct function of the various extended and retracted positions of the bucket cylinder. When the pointer of the indicator means indicates a certain predetermined pivoted position of the bucket on the scale, such as the digging position shown in FIGURE 1, an electrical switch is operated by the pointer at that position. When the electric switch is operated by the pointer, a circuit is completed for operation of a solenoid operated air valve. When the solenoid operated air valve is operated, a source of air under pressure is connected to the small air cylinder to cause its extension and the consequent rotation of the detent sleeve from the operated position to the restored position thereof. Thus it may be seen that when the bucket reaches the digging position in moving from the dump position toward the breakout position, the detent sleeve is operated to its restored position to permit the bucket spool to be returned to the center neutral position under the influence of the spring biasing means for the bucket spool. When the bucket spool returns to the center neutral position, the bucket cylinder is stopped, and the bucket is indexed in the digging position.

The invention also contemplates means for overriding the locking operation of the detent sleeve on the bucket spool. This means comprises a second electric switch which is connected in shunt of the indicator-pointer-operated electric switch. The second switch may be carried at any convenient location in the operator's compartment, such for example as on the end of the hand lever. When the second switch is closed, an alternate circuit is completed for operation of the solenoid operated air valve to cause an extension of the small air cylinder to rotate the detent sleeve to the restored position, and in the restored position the operator may freely manually move the bucket spool from the Breakout position to the Neutral position.

The present invention further contemplates that other means may be provided in substitution of the small air cylinder to operate the detent sleeve from the operated position thereof to the restored position thereof. Further, the present invention contemplates that means other than the detent sleeve may be provided for releasably holding the bucket spool in one operated position thereof. The important construction in the present invention is that, having a vehicle carried tool which is movable through a certain range of movement thereof, with means for moving the tool, and with manually operated and normally self-restoring means for operating the means for moving the tool, there be provided detent means for holding the manually operated and normally self-restoring means in one operated position thereof when that manually operated and normally self-restoring means has been manually operated to that one operated position thereof, and indicator means operating responsive to the operation of the means for moving the tool to a particular position for releasing the detent means to permit the manually operated and normally self-restoring means to self-restore.

The present invention finds particular application to vehicle carried movable tools or implements wherein by virtue of the distance or position of the tool relative to the operator of the vehicle, the accurate positioning of the tool or implement in some position intermediate the range of movement is difficult. This condition commonly occurs in the art of front-end type tractor loaders wherein due to the size of the tractor loader and the location of the operator relative to the cutting edge of the bucket, it is very difficult to adjust the pivoted position of the bucket to achieve an accurate ground level digging position. When applied to a front-end type tractor loader, the present invention substantially increases the efficiency of the tractor loader by freeing the operator of the tractor loader from the necessity of repeatedly attempting to position the bucket in the digging position. In the customary front-end type tractor loader, the work cycle of digging a load, tilting the bucket to the breakout position, raising the boom to a position for convenient carrying of the bucket, carrying the loaded bucket to a position for dumping, generally further raising the boom for dumping of the loaded bucket onto a pile or into a truck, pivoting the bucket to the dump position to deposit the load, lowering the boom and pivoting the bucket from the dump position to the digging position, is constantly repeated. The present invention results in a substantial reduction in work cycle time by permitting the operator of the loader to move the hand lever of the bucket control valve to the position for pivoting of the bucket from the dump position toward the digging position, and while the bucket is pivoting toward the digging position without any further attention from the operator, the operator may concenrate on lowering the boom and returning the tractor to the digging area. This procedure enables the operator to move more rapidly and effectively to control the tractor loader to substantially shorten the cycle time. Further, because the operator's position rearwardly and above the bucket is removed a substantial distance from the cutting edge thereof, it is oftentimes difficult to visually gauge the exact tilted or pivoted position of the bucket for digging with the cutting edge thereof. The automatic indexing of the bucket in the digging position avoids this problem enables the operator to quickly and confidently perform digging operations.

It will be apparent from the hereinafter following detailed description of the present embodiment of the invention that the invention may be used to index the bucket in pivoted positions other than the digging position, or that some tool or implement other than a digging bucket may be indexed in some particular position, or that the invention might also be applied to the hydraulic assembly for raising and lowering the boom to provide for automatic indexing of the boom in some predetermined position.

In detail, one type of tractor loader is shown in side elevation in FIGURE 1 with the boom in a lowered position and with the bucket in the digging position. The dotted lines in FIGURE 1 show the boom in a raised position and the bucket in a raised carrying position and a dump position.

The tractor comprises a frame 10 supported on rearward wheels 11 and forward wheels 12. An operator's compartment 13 is carried on the frame 10 forwardly of the engine compartment 14.

The loader comprises a boom assembly 15 which is pivotally connected at the rearward end thereof to the tractor by a pin means 16. The other end of the boom assembly 15 extends forwardly of the tractor. The forward end of the boom assembly 15 is raised and lowered by hydraulic cylinder means such as hydraulic cylinder 17. The head end of the hydraulic cylinder 17 is pivotally connected to a bracket 18 by a pin 19. The bracket 18 is secured to the frame 10 of the tractor to depend therefrom. The rod end of the hydraulic cylinder 17 is pivotally connected to the boom assembly 15 intermediate the ends therof by a pin 20.

A digging bucket 21 having a cutting edge carried on the forward marginal edge of the bottom wall thereof is pivotally carried on the forward end of boom assembly 15. Flanges such as flange 23 secured to the rearward side of the bucket 21 are provided for the pivotal connection of the bucket 21 to the boom assembly 15. A pin assembly 24 is journaled through the flange 23 and the forward end of the boom assembly 15.

The pivotal position of the bucket 21 relative to the boom assembly 15 is determined by bucket-tilting means comprising a hydraulic cylinder 25, a lever assembly 26 and a link assembly 27. The head end of the hydraulic cylinder 25 is pivotally connected to a bracket 28 by a pin 30. The bracket 28 is carried on the forward end of the tractor substantially at the transverse center thereof. The rod end of the hydraulic cylinder 25 is pivotally connected to one end of the lever assembly 26 by a pin assembly 31. The lever assembly 26 is pivotally carried intermediate the ends thereof on the boom assembly 15 intermediate the ends thereof by a pin assembly 32. The other end of the lever assembly 26 is pivotally connected to one end of the link assembly 27 by a pin assembly 33. The other end of the link assembly 27 is pivotally connected to the flanges 23 on the rear wall of the bucket by a pin assembly 34. The various described members of the bucket tilting means are relatively sized and positioned so that when the hydraulic cylinder 25 is partially extended and the boom is substantially lowered as shown in FIGURE 1, the lever assembly 26 is positioned in a substantially vertical direction and the bucket 21 is positioned in the ground level digging position. When the hydraulic cylinder 25 is substantially completely extended, the bucket 21 is pivoted rearwardly about the axis of the pin assembly 24 to the breakout position. When the hydraulic cylinder 25 is substantially retracted, the bucket 21 is pivoted in a clockwise direction as viewed in FIGURE 1 to the dump position.

A main control valve 37, shown in FIGURES 1 and 5, is provided for selective operation of the hydraulic cylinders 17 and 25 by the operator of the tractor loader. The main control valve 37 is carried in the operator's compartment 13 at a convenient location therein for manual operation. FIGURE 5 shows somewhat diagrammatically the connection of the hydraulic cylinders 17 and 25 to the main control valve 37. The main control valve 37 comprises a bucket spool 38 and a boom spool 39. The body of the valve 37 is provided with a pair of valve bores in which the valve spools 38 and 39 are slidably carried for longitudinal reciprocating movement therein. The upper end of each of the valve spools 38 and 39 extends outwardly of the body of the valve 37. The other or lower end of each of the valve spools 38 and 39 is provided with a biasing assembly 40 for biasing the valve spools 38 and 39 to a center neutral position. The biasing assemblies 40 permit the valve spools 38 and 39 to be moved in either direction from the center neutral position to different operated positions. The biasing assembly 40 for the bucket spool 38 is shown in cross section and may be seen to comprise a pair of washers 41 disposed about a reduced section of the bucket spool 38 with a compressed coiled spring 42 carried between the washers 41. As seen in FIGURE 5, the upper extending end of the valve spool 38 has been moved downwardly toward the body of the valve 37. This has resulted in the valve spool 38 unseating the upper washer 41 from engagement with one end wall within the biasing assembly 40 and a further compression of the coiled spring 42. It may be seen that if the bucket spool 38 is free to move upwardly, the compressed coiled spring 42 will, in reacting against the seated lower washer 41, apply an upward force against the upper washer 41, and through that washer 41 to the bucket spool 38, to urge the bucket spool 38 upwardly until the upper washer 41 is again seated. If when the bucket spool 38 is in a center neutral position, the upper extending end of the bucket spool 38 is drawn upwardly of the body of the valve 37, it may be seen that the lower washer 41 will be unseated by the lower end of the bucket spool 38 to further compress the coiled spring 42. Again, if the bucket spool 38 is free to move, the biasing force of the spring 42 will return the bucket spool 38 to the center neutral position. The specific described arrangement for biasing the bucket spool 38 to the center neutral position is by way of example only, and it should be understood that many other types of self-centering arrangements may be used for the bucket spool 38.

A hydraulic fluid pump 43 capable of supplying sufficient hydraulic fluid under pressure for operation of the hydraulic cylinders 17 and 25 is provided, and the pressure side of the pump 43 is connected to one end of a conduit 44. The other end of the conduit 44 is connected to the valve 37. The suction side of the pump 43 is connected by a conduit 45 to a hydraulic fluid reservoir 46. The hydraulic fluid reservoir 46 is also connected to the valve 37 by a hydraulic fluid conduit 47. The valve bores carrying the valve spools 38 and 39 and the valve spools 38 and 39 are provided with suitable lands and grooves (not shown), cooperating with the connections of the hydraulic cylinders 17 and 25 and the connections of the conduits 47 and 44 to the valve 37 so that when the valve spools 38 and 39 are positioned in the center neutral positions thereof, the conduits to the hydraulic cylinders 17 and 25 are blocked and conduit 44 is connected through the body of the valve 37 to conduit 47. The lands and grooves for the portion of the valve controlling hydraulic cylinder 25 are further so formed that when the upper extending end of the valve spool 38 is moved upwardly from its center neutral position, conduits 44 and 47 are connected to the hydraulic cylinder 25 so that hydraulic fluid under pressure is delivered to the rod end of the hydraulic cylinder 25 while the head end thereof is connected to the reservoir 46 to cause a retraction of the hydraulic cylinder 25 and a consequent pivoting of the bucket 21 toward the dump position. When the upper extending end of the bucket spool 38 is moved downwardly toward the body of the valve 37 from the center neutral position to the position shown in FIGURE 5, hydraulic fluid under pressure is connected to the head end of the hydraulic cylinder 25 while the rod end thereof is connected to the reservoir 46 to cause an extension of the hydraulic cylinder 25 and a consequent pivoting of the bucket 21 toward the breakout position. No detailed description of the construction and operation of the portion of the valve 37 which includes boom spool 39 is believed necessary to a description of the invention.

The bucket spool 38 is manually movable against the bias of the coiled spring 42 by appropriate movement of a hand lever 50. The lower end of the hand lever 50 is secured to a sleeve 50a. The hand lever 50 further includes a lever arm 50b which extends radially outwardly from the sleeve 50a. The sleeve 50a of the hand lever 50 is journaled on a horizontally extending pin 51. One end of the pin 51 is secured to the upper end of a bracket 52. The lower end of the bracket 52 is secured to the body of the valve 37 to upstand therefrom. The outer end of the lever arm 50b is pivotally connected to one end of a link 53 by a pin 54. The link 53 depends from the lever arm 50b and the lower end of the link 53 is pivotally connected to the upwardly extending end of the bucket spool 38 by a pin 55. The pin 55 extends substantially outwardly of each side of the upwardly extending end of the bucket spool 38 as may be seen in FIGURES 6 and 7. Since the bucket spool 38 is shown in FIGURE 5 in its lowermost position, it will be appreciated that the hand lever 50 is shown in its raised position.

The means which cooperates with the bucket spool portion of the valve 37 to provide for automatic indexing of the bucket 21 comprises, in the present embodiment, a detent sleeve 57 and a small fluid cylinder 58. The detent sleeve 57 is positioned over the upwardly extending end of the bucket spool 38 and is rotatively supported on the body of valve 37 by a plate 59. As may be seen in FIGURE 7, the plate 59 is provided with a stepped hole therethrough which admits the detent sleeve 57 and cooperates with a radially outwardly extending shoulder on the lower end of the detent sleeve 57 to retain the detent sleeve 57 on the valve 37 while permitting rotation thereof. The plate 59 is secured to the upper surface of the body of the valve 37 by a plurality of fasteners 60. The circular inner wall of the detent sleeve 57 is provided with a plurality of longitudinally extending slots 61. As shown in FIGURE 6, the slots 61 are four in number and are positioned substantially 90 degree apart. The slots 61 have a width and depth sufficient to permit the passage of the end portions of the pin 55 and the side marginal edges of the upwardly extending end of the bucket spool 38 to pass therealong when the pin 55 and one pair of the slots 61 are in register. As may be seen in FIGURE 7, the slots 61 do not extend the full length of the inner wall of the detent sleeve 57 but terminate immediately above a lower cylindrical inner portion of the detent sleeve 57 which in no way interferes with the pin 55 or the upwardly extending end of the bucket spool 38. FIGURE 7 also shows by the legends Dump, Neutral, and Breakout, the three longitudinal positions of the bucket spool 38 in relation to the detent sleeve 57. Thus it may be seen that the center neutral position of the bucket spool 38 occurs when the pin 55 is within the lower portion of the slots 61. Further, the dump position occurs when the pin 55 is in the upper portion of the slots 61, and the breakout position occurs when the pin 55 is disposed below the slots 61 in the lower cylindrical portion of the detent sleeve 57. As shown in FIGURES 6 and 7, where the bucket spool 38 is in the operated position for pivoting of the bucket toward the breakout position, it may be seen that the bucket spool 38 is effectively locked in that longitudinal position because the detent sleeve 57 is not in a rotated position wherein the slots 61 are in register with the pin 55. It may further be seen that if the detent sleeve 57 is rotated so that the slots 61 are in register with the pin 55, the biasing means 40 for the bucket spool 38 will longitudinally move the bucket spool 38 upwardly to the center neutral position with the pin 55 entering into the slots 61.

The bucket spool 38 is not free to rotate about its longitudinal axis, and in any existing valve arrangement to which the present embodiment of the invention is applied, some means must be provided for preventing rotation of the valve spool because of the biasing arrangement for the detent sleeve 57 which would tend to rotate the bucket spool when the pin 55 is within the slots 61. The detent sleeve 57 is rotatively biased in one direction by a coiled spring 62 which is relatively loosely wound about the detent sleeve 57. One end of the coiled spring 62 is keyed into the detent sleeve 57, as may be seen in FIGURE 6, and the other end of the coiled spring 62 is keyed into the plate 59 as may be seen in FIGURES 6 and 7. The detent sleeve 57 is provided with a stop or arm 63 which extends radially outwardly thereof, and the turns of the coiled spring 62 are tightened so that the detent sleeve 57 is rotatively biased wtih the arm 63 projecting against the extending end of the piston rod 58a of the small air cylinder 58. The small air cylinder 58 is secured to the plate 59 and is positioned so that when the piston rod 58a is extended responsive to the application of air under pressure to the head end thereof, the detent sleeve 57 will be rotated by the arm 63 and against the bias of the coiled spring 62 to a position wherein the slots 61 are in register with the pin 55.

One end of a conduit 64 is connected into the head end of the small air cylinder 58 for the application of air under pressure thereto. The other end of the conduit 64 is connected to a solenoid-operated air valve 65. The solenoid-operated air valve 65 is diagrammatically shown in FIGURE 8, and as seen therein, an air pressure conduit 66 and an air exhaust conduit 67 are also connected to the valve 65. The valve 65 is so constructed that when the solenoid thereof is energized, the valve is operated to connect the air pressure conduit 66 to conduit 64, and when the solenoid thereof is de-energized, the air exhaust conduit 67 is connected to conduit 64. A source of air under pressure for the conduit 66 is generally found in existing tractor loaders wherein compressed air is commonly used for operation of the wheel brakes of the tractor.

The solenoid of the solenoid-operated air valve 65 is momentarily operated in the present embodiment by an electric switch 70 which is shown in FIGURES 2, 3 and 9. One side of the electric switch 70 is connected to a source of power 71 which may be the storage battery of the tractor. The other side of the power source 71 is grounded as is one side of the solenoid of the solenoid-operated air valve 65. The other side of the solenoid is connected to the other side of the electric switch 70.

As shown in FIGURES 1 through 4, the switch 70 is carried in cooperation with a bucket position indicator mechanism indicated generally at 72. The specific bucket position indicator mechanism 72 shown in the drawings is by way of example only and many other types of indicator system may be used to operate switch 70. The specific bucket position indicator mechanism 72 comprises an arrangement which operates responsive to extensions and retractions of the bucket-tilting cylinder 25 to indicate on a scale the various positions to which the bucket 21 is pivoted. This may be accomplished because the operated length of the bucket-tilting cylinder 25 is a direct function of the tilted position of the bucket 21. The indicator mechanism 72 basically comprises three assemblies, a quadrant 73 and tube 74 assembly, an indicator arm 75 and rod 76 assembly, and a tube 77 assembly.

The assembly of the quadrant 73 and the tube 74 comprises the construction of the quadrant 73 as a generally semicircular plate having a scale on the side thereof toward the operator's compartment 13. The tubular member 74 is secured to the lower marginal edge of the quadrant 73 at the center thereof with the tube 74 extending perpendicular to the plane of the quadrant 73. A flange 78 is secured to the tube 74 to extend radially therefrom at the end thereof which is secured to the quadrant 73. The outer end of the flange 78 is pivotally carried on the axis of the pin 30 which pivotally connects the head end of the bucket cylinder 25 to the bracket 28 on the tractor. This arrangement permits the tube 74 to extend parallel to the longitudinal axis of the bucket cylinder 25 and toward the rod end thereof.

The assembly of the indicator arm 75 and the rod 76 comprises a circular plate 80 to which the indicator arm 75 is secured to extend radially therefrom. The circular plate 80 is secured to one end of a bushing and sleeve arrangement 81. The bushing and sleeve arrangement 81 is rotatively carried in the end of the tube 74 which is secured to the quadrant 73 so that the indicator arm 75 may sweep over the scale on the quadrant 73 as the bushing and sleeve arrangement 81 and the plate 80 are rotated. The bushing and sleeve arrangement 81 is held against any lengthwise movement relative to the tube 74. The rod 76 is carried in the tube 74 and one end of the rod 76 is secured in the inner end of the sleeve portion of the bushing and sleeve arrangement 81. The rod 76 is twisted about its longitudinal axis and intermediate the ends thereof as may be seen in FIGURES 2 and 4. From the foregoing it may be seen that if the rod 76 is rotated about its longitudinal axis, the indicator arm 75 will sweep over the scale on the quadrant 73 to indicate the rotated position of the rod 76.

The assembly of the tube 77 comprises a circular plate 83 which is secured over one end of the tube 77. The plate 83 is provided with a slot therethrough having a length and width substantially equal to the width and thickness of the rod 76. The rod 76 extends through the slot in the plate 83 and into the tube 77. The end of the tube 77 opposite from the end having the plate 83 is provided with a flange 84. The flange 84 extends perpendicularly from the longitudinal axis of the tube 77 and at its outer end is pivotally carried on the axis of the pin 31 which pivotally connects the rod end of the bucket cylinder 25 to the upper end of the lever assembly 26. This arrangement permits the tube 77 to extend parallel to the longitudinal axis of the bucket cylinder 25 and into the tube 74 in a telescoping arrangement therewith. From the foregoing, it may be seen that as the bucket cylinder 25 is extended and retracted, the tubes 74 and 77 are similarly extended and retracted, and as the tubes 74 and 77 slide longitudinally of each other, the slot in the plate 83 of the tube 77 will cause the rod 76 to be twisted about its longitudinal axis to in turn cause the indicator arm 75 to sweep across the face of the scale on the quadrant 73.

The various assemblies of the indicator mechanism 72 are so sized and positioned that when the bucket cylinder 25 is extended to the position shown in FIGURE 1 with the bucket 21 in the digging position, the indicator arm 75 is disposed substantially vertically on the scale of the quadrant 73 to indicate that digging position of the bucket 21 to the operator of the tractor loader seated in the operator's compartment 13. When the bucket cylinder 25 is substantially completely extended to pivot the bucket 21 to the breakout position, the indicator arm 75 will indicate that bucket position on the scale of the quadrant 73, and when the bucket cylinder 25 is substantially completely retracted, the indicator arm 75 will indicate the dumping position of the bucket on the scale of the quadrant 73.

The previously described electric switch 70 for operating the solenoid-operated air valve 65 is carried on the quadrant 73 with the operating mechanism of the switch 70 positioned so that the indicator arm 75 will operate the switch 70 to close its contacts when the indicator arm 75 indicates the digging position of the bucket 21 on the scale of the quadrant 73. Because of slight time delays in the operation of the various components of the present embodiment of the invention, the switch 70 may be positioned on the quadrant 73 slightly before the exact indication of the digging position thereon as the indicator arm 75 moves from the dumping position, so that when the indicator arm 75 closes the switch 70, the solenoid-operated air valve 65 will then be operated to supply air under pressure to the small air cylinder 58. The small air cylinder 58 will then extend its piston rod 58a against the arm 63 of the detent sleeve 57. The detent sleeve 57 will then be rotated to a position wherein the pin 55 is in register with the slots 61, and the biasing assembly 40 of the bucket spool 38 will move the bucket spool 38 upwardly to the center neutral position with the pin 55 entering the slots 61. With the movement of the bucket spool 38 to the center neutral position, the extension of the bucket cylinder 25 will be stopped with the bucket 21 accurately indexed in the digging position and with the indicator arm 75 indicating that exact digging position on the scale of the quadrant 73. By the time the bucket cylinder 25 has been stopped with the bucket 21 indexed in the digging position, the indicator arm 75 will have passed over the operating mechanism of the switch 70, and the switch 70 will have restored to open its contacts thereby de-energizing the solenoid of the solenoid-operated air valve 65. The head end of the air cylinder 58 will then be connected to exhaust and the piston rod 58a will no longer urge the arm 63 of the detent sleeve 57 against bias of the coiled spring 62. However, it should be noted that the detent sleeve 57 is not free at this time to rotate due to the holding force of the pin 55 in the slots 61. The detent sleeve 57 will again only be rotated when the hand lever 50 is raised to move the bucket spool 38 downwardly out of the slots 61 and to the operated position thereof for extension of the bucket cylinder 25.

The invention further includes means for overriding the automatic indexing operation, and this means is an electric switch 85 which is shown in FIGURE 9. The switch 85 is connected in shunt of the switch 70 so that whenever the switch 85 is closed, the solenoid-operated air valve 65 is operated to cause the air cylinder 58 to maintain the detent sleeve 57 in the rotated position wherein the pin 55 is in register with the slots 61. It is contemplated that the switch 85 be placed in the operator's compartment 13 at some convenient position for operation by the operator. Such a position for example could be on the tip of the hand lever 50.

Having described the invention what is considered new and desired to be protected by Letters Patent is:

1. In an arrangement of a tractor having an implement movably carried from said tractor, a hydraulic cylinder connected to said implement for moving said implement responsive to operations of said hydraulic cylinder, a hydraulic valve selectively alternatively manually operable from a neutral self-restored position to a first operated position and a second operated position, hydraulic circuit means connecting said hydraulic valve to said hydraulic cylinder so that said hydraulic cylinder is extended when said manually operable valve is held in said first operated position and retracted when said manually operable valve is held in said second operated position to selectively move said implement, and indexing means including a slotted detent sleeve operating responsive to an operation of said hydraulic valve to said first operated position to hold said hydraulic valve operated and other means operating responsive to a particular extension of said hydraulic cylinder for restoring said slotted detent sleeve to permit said hydraulic valve to restore to said neutral self-restored position.

2. In a tractor loader having a pivotally carried bucket, linkage means including a hydraulic cylinder connected to said bucket so that said bucket is pivoted in either of two directions responsive to operations of said hydraulic cylinder, a hydraulic valve, hydraulic circuit means connecting said hydraulic valve to said hydraulic cylinder for operation of said hydraulic cylinder responsive to operations of said hydraulic valve to selectively pivot said bucket a selected amount in either of said two directions, and indexing means including a slotted detent sleeve operable to hold said hydraulic valve operated when said hydraulic valve is operated to pivot said bucket in a certain one of said two directions and another means operating responsive to a particular operation of said hydraulic cylinder for restoring said slotted detent sleeve.

3. In an arrangement of a tractor having an implement movably carried from said tractor, a hydraulic cylinder connected to said implement for moving said implement responsive to operation of said hydraulic cylinder, a hydraulic valve including a reciprocating valve spool and means biasing said valve spool to a center neutral position, hydraulic circuit means connecting said hydraulic valve to said hydraulic cylinder, said hydraulic valve being formed so that said hydraulic cylinder is operated in one direction when said valve spool is manually moved in one direction from said center neutral position and so that said hydraulic cylinder is operated in another direction when said valve spool is manually moved in the opposite direction from said center neutral position, a slotted detent sleeve carried in cooperation with one end of said valve spool and operating responsive to the manual movement of said valve spool in said one direction from said center neutral position for holding said valve spool in the operated position thereof, and other means operating responsive to a predetermined operation of said hydraulic cylinder for restoring said slotted detent sleeve to permit the biasing means to restore said valve spool to said center neutral position.

4. In an arrangement of a tractor having an implement movably carried from said tractor, a hydraulic cylinder connected to said implement for moving said implement responsive to operation of said hydraulic cylinder, a hydraulic valve including a reciprocating valve spool and means biasing said valve spool to a center neutral position, hydraulic circuit means connecting said hydraulic valve to said hydraulic cylinder, said hydraulic valve being formed so that said hydraulic cylinder is operated in one direction when said valve spool is manually moved in one direction from said center neutral position and so that said hydraulic cylinder is operated in another direction when said valve spool is manually moved in the opposite direction from said center neutral position, detent means carried in cooperation with one end of said valve spool and operating responsive to the manual movement of said valve spool in said one direction from said center neutral position for holding said valve spool in the operated position thereof, and other means operating responsive to a predetermined operation of said hydraulic cylinder for restoring said detent means to permit the biasing means to restore said valve spool to said center neutral position, said one end of said valve spool carrying an extending pin, and said detent means comprising a sleeve rotatively carried over said one end of said valve spool, said detent sleeve having a plurality of slots in the inner wall thereof, said slots positioned in said detent sleeve relative to said pin so that when said valve spool is moved between said center neutral position and said opposite direction said pin is moved in said slots with said detent sleeve in a restored position and so that said pin is moved out of said slots when said valve spool is moved in said one direction from said center neutral position, said detent sleeve further being formed so that when said pin is moved out of said slots said detent sleeve is rotatable from the restored position to the operated position thereof to engage said pin and hold said valve spool in the operated position thereof, means for rotating said sleeve from said restored position to said operated position when said pin is moved out of said slots, and said other means cooperating with said detent sleeve to rotate said detent sleeve to said restored position responsive to said predetermined operation of said hydraulic cylinder to permit said biasing means to move said valve spool to said center neutral position with said pin in said slots.

5. In an arrangement as defined in claim 4, wherein said detent sleeve carries an arm extending radially outwardly thereof, and wherein said other means comprises a fluid clyinder having a piston rod positioned in engagement with said arm so that when said fluid cylinder is operated said detent sleeve is rotated from said operated position to said restored position thereof, indicator means for visually indicating the operation of said hydraulic cylinder and for detecting said predetermined operation of said hydraulic cylinder, and means operating responsive to the detection of said predetermined operation of said hydraulic cylinder by said indicator means for operating said fluid cylinder.

References Cited by the Examiner

UNITED STATES PATENTS

| 2,311,516 | 2/43 | Brown et al. | 91—389 X |
| 2,614,537 | 10/52 | Starr | 91—389 X |
| 3,045,845 | 7/62 | Hackett et al. | 214—140 |

FOREIGN PATENTS 549,134  11/42  Great Britain.

HUGO O. SCHULZ, *Primary Examiner.*